Sept. 22, 1959     E. G. GARDINER     2,905,510

SHAFT BEARING LUBRICATION MEANS

Filed Oct. 12, 1956

INVENTOR.
EMMETT G. GARDINER
BY
Ferd L. Medlhoff
HIS ATTORNEY

United States Patent Office 2,905,510
Patented Sept. 22, 1959

---

2,905,510

SHAFT BEARING LUBRICATION MEANS

Emmett G. Gardiner, Louisville, Ky., assignor to General Electric Company, a corporation of New York Application October 12, 1956, Serial No. 615,715

2 Claims. (Cl. 308—134.1)

---

The present invention relates to the lubrication of shaft bearings, and more particularly to an improved arrangement for supplying, immediately after the initial rotation of the shaft, a lubricant to bearings to which lubricant is otherwise slow in reaching due to their remote position in relation to the main source of lubricant supply.

Although it will be understood that the invention is broadly applicable to the lubrication of bearings supporting a shaft adapted to rotate about a vertical or somewhat inclined axis, it is particularly useful in connection with refrigerant compressors having a shaft arranged to rotate about a substantially vertical axis, and for the purposes of illustration, the invention will be shown and described in connection with such a compressor of the rotary type.

One form of hermetic compressor of this type includes a hermetic casing housing a compressor unit and a motor for driving the compressor which are mounted one above the other on a common vertical shaft. The shaft is journalled into axially aligned bearings suitably supported within the casing. The lower portion of the hermetic casing contains a body of lubricating oil which is employed to lubricate the various bearing surfaces of the compressor unit. In order to provide the proper lubrication of any bearing surfaces above the normal oil level, it is, of course, necessary to provide some means for conveying lubricating oil from the oil reservoir to such surfaces. A simple known means for providing lubrication to such bearing surfaces disposed above the normal oil level in the reservoir is to extend the shaft to a point below the normal level of the body of lubricating oil contained in the lower portion of the casing and provide an axially extending passage within the shaft which communicates with the body of oil. Lubricant entering the lower portion of the lubricant passage is forced by centrifugal forces created within the rotating shaft to flow upwardly along the inner surfaces of the passage and into suitable oil outlets which transmit lubricant to the bearing surfaces. In this type of lubricating arrangement, and many other types well known in the art, when the compressor is first started, a period of time must elapse before the lubricant from the main source of lubricant supply reaches bearings disposed in a position remote from the main source of supply, such as is the case of the upper bearing of the hermetic compressor described above. During this elapse of time there is a great likelihood of the bearing burning out before proper lubrication is supplied.

It is an object of this invention to provide a lubricating arrangement for a bearing disposed above a body of lubricant including a simple and effective means for providing a temporary supply of lubricant to the bearing immediately upon initial rotation of the shaft.

More specifically, it is an object of this invention to provide means for providing a temporary supply of lubricant at a remotely disposed bearing surface which is forced by centrifugal action to immediately lubricate the bearing surface during the initial rotation of the shaft.

Further objects and advantages will become apparent as the following description proceeds and the features of novelty which characterize the invention will be pointed out with particularity in the claims annexed to and forming a part of this specification.

In carrying out the objects of this invention there is provided a vertically extending shaft rotatably supported by bearing surfaces, at least one of which is remotely positioned in relation to a main oil supply so that when the compressor is started a short period of time elapses before proper lubrication can be supplied to the bearing from the sump. An upwardly extending groove on the shaft receives lubricant pumped from the main source of lubricant supply and spreads it over the bearing surfaces during rotation of the shaft. In order to trap and store lubricant adjacent the bearing surface for immediate lubrication thereof following an idle period, there is provided a downwardly slanting oil storage recess in the shaft connecting with the groove adjacent its lower portion thereof. Oil or lubricant, flowing downwardly along the groove after the shaft stops rotating, is stored within the recess and is forced by centrifugal force to flow immediately into the groove when the shaft resumes rotation, thus providing an immediate supply of lubricant to the bearing surfaces during the interim period before lubricant from the main lubricant supply is able to reach the bearing.

For a better understanding of the invention, reference may be had to the accompanying drawing in which.

Figure 1:
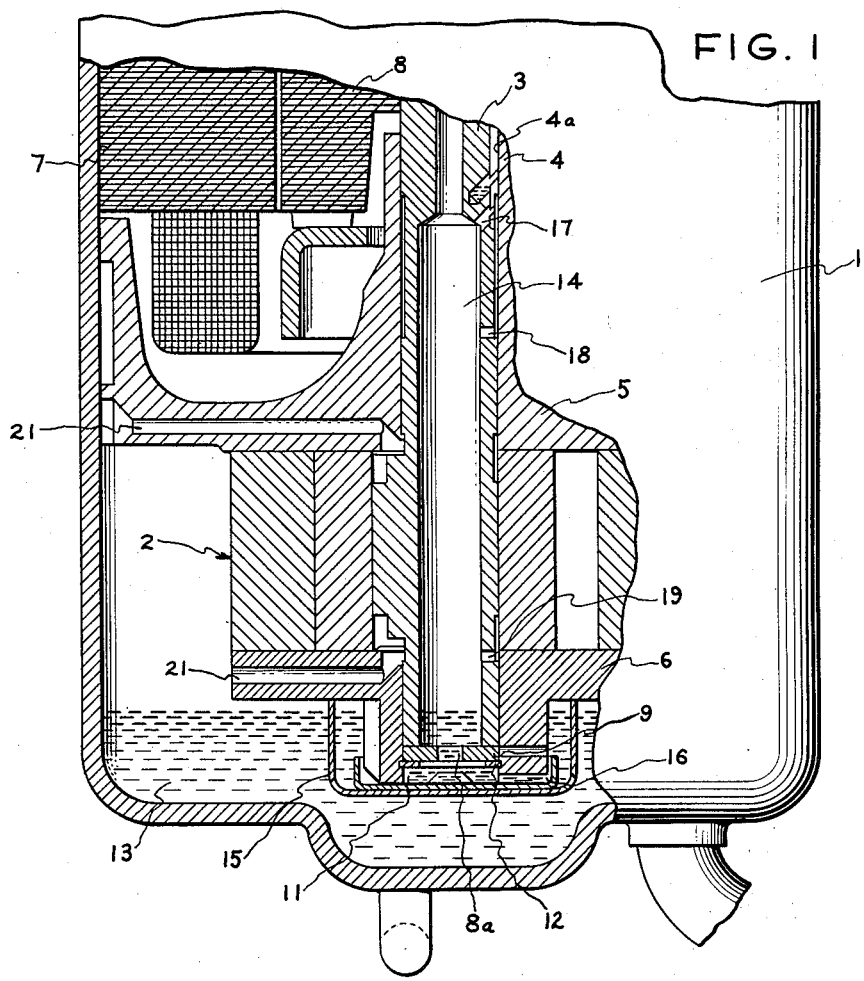
Fig. 1 is a side elevation view, partly in section of a hermetic refrigerant compressor incorporating an embodiment of the invention.

Referring to the drawing, the invention is shown in a hermetic compressor including a hermetic casing 1 in which is suitably supported a refrigeration compressor unit 2 which includes a vertical shaft 3 supported by axially aligned bearings 4, 5 and 6. Mounted in the upper portion of the hermetic casing is a motor 7 having a rotor 8 positioned upon the shaft 3 for driving the rotary compressor 2. Serving as a thrust bearing for the shaft 3, a thrust plate or washer 9 is disposed within the cavity 11 in the lower bearing 6 and locked into place by locking ring 12.

In order to provide a source of lubricating oil for the various bearing surfaces of the compressor unit there is employed a reservoir or body of oil 13 in the lower portion of the hermetic casing. This body of oil is of sufficient depth that the lower end of the shaft and a portion of the bearing 6 are substantially immersed in the oil. For the purpose of providing lubricating oil to the various moving parts of the compressor unit 2 and particularly the bearing 4, a relatively large axially extending passage 14 is provided in the shaft 3. The axially extending passage is in communication with the reservoir through a hole 8a provided in the thrust plate 9. To prevent dirt and other particles from entering the axially extending passage 14 along with the lubricating oil, a pair of filtering cups 15 and 16 are positioned around the end of the bearing cavity 11 to form a tortuous path through which the oil must flow upon entering the bearing cavity 11. Upon rotation of the shaft, lubricant entering the axial passage 14 is forced to quickly assume the rotational speed of the shaft 3. Centrifugal force then causes the lubricant to flow outwardly against the inner surface of the axial passage 14 and upwardly along the inner surface of the passage 14. Oil outlets, 17, 18 and 19 in the circumference of the shaft transmit lubricant from the passage to the various bearing surfaces. Suitable channels 21 located in the bearing support provide a means for returning lubricant from the bearings back into the oil reservoir 13.

As thus far described, however, this compressor with its vertical shaft and associated bearings forms no part of the present invention, but is intended rather to be illustrative of the type of device, including a lubricating means operative only when the shaft is rotating, to which the present invention may be adapted. As will now be explained, the invention deals with lubrication of the upper bearing and means incorporated upon the shaft adjacent the upper bearing for supplying this lubrication.

Figure 2:
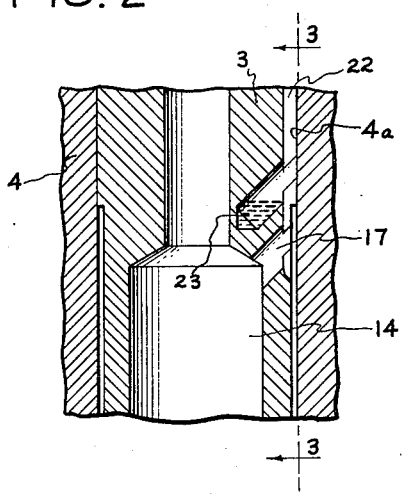
Fig. 2 is a partial cross sectional view showing the storage recess and its relation to the shaft and groove.
Figure 3:
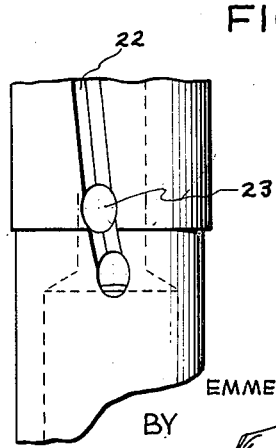
Fig. 3 is a partial view of the shaft taken along the line 3—3 of Fig. 2.

As may best be seen in Figs. 2 and 3 there is provided on the outer periphery of the shaft 3 adjacent the bearing 4 an oil pumping or spreading groove 22 connected at one end thereof with the oil outlet 17 leading to the axially extending passage 14. Referring to Fig. 3 it may be seen that the groove 22 is pitched to the left which is the direction opposite the direction of rotation of the shaft. Oil or lubricant which flows upwardly along the inner surface of the axially extending passage 14, passes through the oil outlet 17 and is thereby carried upwardly by the groove 22 to provide lubrication of the bearing surface 4a. As will be evident from Fig. 1, a short period of time must elapse before oil from the reservoir 13 will flow upwardly along the passage 14 and reach the groove 22. In order to provide a temporary source of lubrication for the bearing surface 4a during this interim period, the present invention provides for a small oil storage recess 23 formed in the shaft 3 adjacent the lower extremities of the groove 22. This downwardly slanting recess 23 provides a storage space for oil accumulated in the groove 22 after the rotation of the shaft ceases. As can be seen in Figs. 2 and 3, oil remaining in the upper portions of the groove 22 will flow downwardly due to the force of gravity when the shaft stops and will thereupon flow into the storage recess 23 which connects with the groove 22. Thereafter, when the shaft 3 resumes rotation the oil stored within the storage recess 23 will be forced outwardly by centrifugal force into the groove 22 and thereupon forced upwardly over the bearing surface 4a. This temporary supply of lubricant will prevent the bearing from burning out while lubricant from the main reservoir 13 is being pumped upwardly by the centrifugal pumping means described above.

Obviously, the above described storage recess and cooperating lubricating groove can be used in connection with any vertically disposed rotating shaft regardless of the type of lubricating means provided for the bearings. Thus lubricant could be supplied to the groove 22 from some point other than the oil outlet positioned adjacent the bottom portion of the groove and by means other than the centrifugal pumping arrangement described above. For example, lubricant could be introduced into the groove at some point above the storage recess and a temporary supply of lubricant would still be stored or trapped in the storage recess 23 when the shaft ceases to rotate.

By the present invention there is provided an improved lubricating arrangement to be utilized with a vertically disposed shaft journalled in a bearing where the bearing for some reason or other, is slow in receiving lubricant from the main oil supply. The arrangement set forth in the above description will provide an immediate supply of lubricant to the bearing thereby preventing undue heating of the bearing before lubrication is provided by the regular lubricating means.

While in accordance with the patent statutes there has been described what at present is considered to be the preferred embodiment of the invention, it will be obvious to those skilled in the art that various changes and modifications may be made therein without departing from the invention, and it is, therefore, the aim in the appended claims to cover all equivalent variations as fall within the true spirit and scope of the invention.

What I claim as new and desire to secure by Letters Patent of the United States is:

1. A bearing lubricating arrangement comprising a casing, a body of lubricant in said casing, at least one bearing surface disposed above said body of lubricant, a vertical shaft journaled in said bearing surface, means for feeding lubricant to said bearing surface during rotation of said shaft, an upwardly extending groove on said shaft at said bearing surface for spreading lubricant received from said body of lubricant over said bearing surface during rotation of said shaft, and a downwardly slanting oil storage recess positioned in said shaft, said oil storage recess connecting with said groove adjacent the lower portion thereof whereby said storage recess traps lubricant remaining within said groove after said shaft ceases to rotate to provide a supply of lubricant which immediately flows to said bearing surfaces when said shaft resumes rotation.

2. A bearing lubricating arrangement comprising a casing, a body of lubricant in said casing, at least one bearing surface disposed above said body of lubricant, a vertical shaft journalled in said bearing surface and having one end immersed in said body of lubricant, centrifugal pumping means for supplying lubricant to said bearing surface, said centrifugal pumping means including an axially extending passage within said shaft opening into said body of lubricant and an oil outlet connecting said passage with said bearing surface at the lower portion thereof, an upwardly extending groove connecting with said oil outlet on said shaft at said bearing surface for spreading lubricant received from said centrifugal pumping means over said bearing surfaces during rotation of said shaft, and a downwardly slanting oil storage recess positioned in said shaft, said oil storage recess connecting with said groove adjacent the lower portion thereof whereby said storage recess traps lubricant remaining within said groove and flowing downwardly within said groove after said shaft ceases to rotate to provide a supply of lubricant which is forced by centrifugal force to flow immediately into said groove when said shaft resumes rotation.

References Cited in the file of this patent
UNITED STATES PATENTS

| | | |
|---|---|---|
| 1,200,626 | Lane | Oct. 10, 1916 |
| 1,210,836 | Ramsey | Jan. 2, 1917 |
| 2,067,123 | Hait | Jan. 5, 1937 |
| 2,212,223 | Barnes | Aug. 20, 1940 |
| 2,253,416 | Caldwell | Aug. 19, 1941 |
| 2,500,751 | Halfvarson | Mar. 14, 1950 |
| 2,628,016 | Higham | Feb. 10, 1953 |